United States Patent [19]
Harper et al.

[11] Patent Number: 5,530,887
[45] Date of Patent: Jun. 25, 1996

[54] METHODS AND APPARATUS FOR PROVIDING AUTOMATIC HARDWARE DEVICE IDENTIFICATION IN COMPUTER SYSTEMS THAT INCLUDE MULTI-CARD ADAPTERS AND/OR MULTI-CARD PLANAR COMPLEXES

[75] Inventors: Jeffrey D. Harper, Austin; James C. Peterson, Round Rock, both of Tex.; James D. Touchton, Davie, Fla.; Wendel G. Voigt; Gregory M. Vrana, both of Austin, Tex.

[73] Assignee: International Business Machines Corporation, Armonk, N.Y.

[21] Appl. No.: 204,692

[22] Filed: Feb. 28, 1994

Related U.S. Application Data

[63] Continuation of Ser. No. 659,661, Feb. 22, 1991, abandoned.

[51] Int. Cl.$^6$ ............................ G06F 9/445; G06F 13/10
[52] U.S. Cl. .................................... 395/800; 364/DIG. 1; 364/DIG. 2; 395/650; 395/775; 395/309
[58] Field of Search ........................ 395/800, 275, 395/400, 164, 425, 165, 325, 166, 200, 650, 500, 775, 725, 575, 308, 877, 416, 282, 421.09; 364/DIG. 1, DIG. 2, 134, 578; 365/230.09, 230.03, 189.07; 340/825.03, 825.57, 825.15, 825.07; 371/22.2

[56] References Cited

U.S. PATENT DOCUMENTS

| | | | |
|---|---|---|---|
| Re. 31,318 | 7/1983 | Kaufman et al. | 395/425 |
| 3,898,631 | 8/1975 | Brown et al. | 364/929.1 |
| 4,266,285 | 5/1981 | Panepinto, Jr. | 365/230.03 |
| 4,281,392 | 7/1981 | Grants et al. | 395/425 |
| 4,354,258 | 10/1982 | Sato | 365/189.07 |
| 4,499,536 | 2/1985 | Gemma et al. | 395/425 |
| 4,545,010 | 10/1985 | Salas et al. | 395/425 |
| 4,556,953 | 12/1985 | Capiro et al. | 395/325 |
| 4,566,082 | 1/1986 | Anderson et al. | 365/230.03 |
| 4,670,855 | 6/1987 | Capiro et al. | 395/325 |
| 4,679,167 | 7/1987 | Finnell | 395/700 |
| 4,683,550 | 7/1987 | Jindrick et al. | 364/709.1 |
| 4,899,272 | 2/1990 | Fung et al. | 395/425 |
| 4,956,852 | 9/1990 | Hodge | 340/825.07 |
| 4,970,644 | 11/1990 | Berneking et al. | 364/422 |
| 4,999,805 | 3/1991 | Culley et al. | 395/325 |
| 5,034,882 | 7/1991 | Eisenhard et al. | 395/650 |
| 5,067,105 | 11/1991 | Borkenhagen et al. | 395/400 |
| 5,111,423 | 5/1992 | Kopec, Jr. et al. | 395/500 |
| 5,138,706 | 8/1992 | Melo et al. | 395/500 |
| 5,148,389 | 9/1992 | Hughes | 395/800 |
| 5,179,558 | 1/1993 | Thacker et al. | 395/425 |
| 5,201,038 | 4/1993 | Fielder | 395/325 |
| 5,287,531 | 2/1994 | Rogers, Jr. et al. | 395/800 |

*Primary Examiner*—Daniel Pan
*Attorney, Agent, or Firm*—George E. Grosser; Keith L. Hargrove; Andrew J. Dillon

[57] ABSTRACT

Data processing apparatus performs automatic hardware device identification and system setup in computer systems that have a Programmable Option Select (POS) feature, where the system includes multi-card adapters (adapters with attached daughter card(s)), and/or multi-card planar complexes (system boards with pluggable processor complexes and/or I/O risers). In particular, the apparatus uniquely identifies the aforementioned multi-card devices utilizing unique "combination type" POS IDs, where a combination type POS ID is a POS ID specifically preassigned to a combination of cards rather than to a single type of card. According to the invention, the unique combination type POS ID is partitioned across the combination of cards (for example, hardwired into each card). When the cards are combined, the partitioned ID is synthesized and becomes available to the system. The combination type ID may be used by the system to automatically identify and configure the multi-card device combination, perform diagnostics, etc., in the same manner that card type IDs are utilized to identify and configure individual feature cards in conventional systems supporting a POS type feature.

6 Claims, 3 Drawing Sheets

FIG. 1
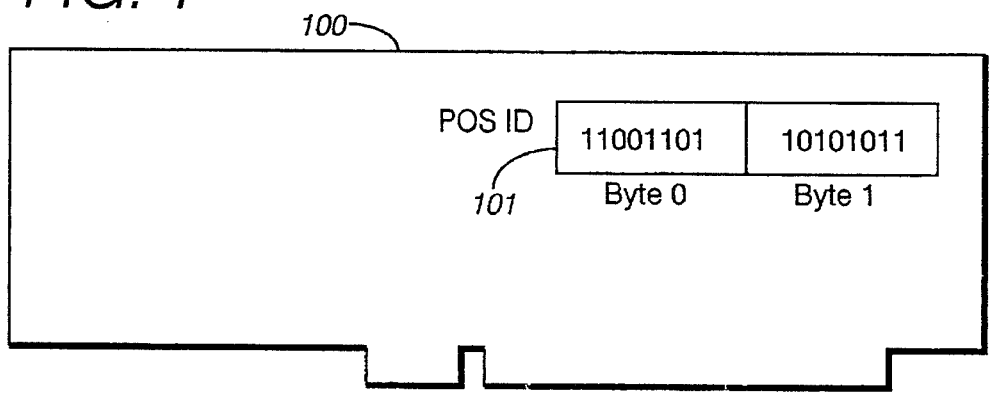
FIG. 2
| CARD | ID | ADAPTER "A" ABC | | | | |
|---|---|---|---|---|---|---|
| NO DAUGHTER CARD | - | ABCF | • | • | • | • |
| DAUGHTER "1" | E | • | ABCE | • | • | • |
| DAUGHTER "2" | D | • | • | ABCD | • | • |
| DAUGHTER "3" | C | • | • | • | ABCC | • |
| DAUGHTER "4" | B | • | • | • | • | ABCB |
FIG. 3
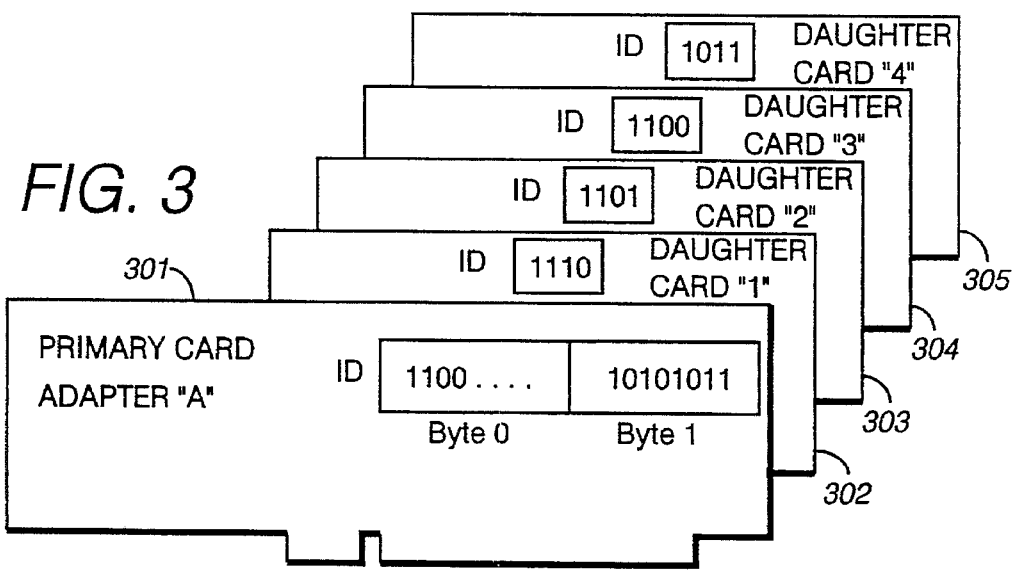

FIG. 4A

| CARD | ID (IN BINARY) | | | | ID (IN HEX) |
|---|---|---|---|---|---|
| SYSTEM BOARD | 1001 | .... | .... | .... | (9 - - -) |
| I/O RISER CARD "A" | .... | 1010 | .... | .... | (- A - -) |
| I/O RISER CARD "B" | .... | 1011 | .... | .... | (- B - -) |
| PROCESSOR COMPLEX "C" | .... | .... | 1100 | .... | (- - C -) |
| PROCESSOR COMPLEX "D" | .... | .... | 1101 | .... | (- - D -) |
| SECONDARY CARD "E" | .... | .... | .... | 1110 | (- - - E) |

FIG. 4B

| | |
|---|---|
| SYSTEM "A", MODEL "C" . . . . . . . | 9ACF |
| SYSTEM "B", MODEL "D" . . . . . . . | 9BDF |
| SYSTEM "B", MODEL "D"     WITH COPROCESSOR . . . . . . | 9BDE |
| SPECIAL PROJECT     SYSTEM "A" WITHOUT I/O         MODEL "D" WITH COPROCESSOR            FOR FAST DUMB TERMINAL APPLICATION | 9FDE |

METHODS AND APPARATUS FOR PROVIDING AUTOMATIC HARDWARE DEVICE IDENTIFICATION IN COMPUTER SYSTEMS THAT INCLUDE MULTI-CARD ADAPTERS AND/OR MULTI-CARD PLANAR COMPLEXES

This is a continuation of application Ser. No. 07/659,661, filed Feb. 22, 1991, now abandoned.

BACKGROUND OF THE INVENTION

1. Field of the Invention

The invention relates generally to computer systems in which hardware device identification and system setup are performed automatically using a Programmable Option Select (POS) feature. An example of such a system is the commercially available IBM PS/2 Model 70, personal computing system (the terms IBM and IBM PS/2, are registered trademarks of International Business Machines Corporation), in which (1) software-writeable latches on each adapter card coupling a peripheral device to the system store card/device configuration information and (2) a unique "card type" POS ID value is hardwired onto each card to identify the type of card and associated peripheral device attached to the system. All cards of the same type have the same POS ID. The POS feature eliminates the need to use manual switches for device setup purposes.

More particularly, the invention relates to methods and apparatus for performing automatic hardware device identification and system setup in computer systems that include multi-card adapters (adapters with attached daughter card(s), sometimes also referred to herein as attached secondary card(s)), and/or multi-card planar complexes (system boards with pluggable processor complexes and/or I/O risers). In particular, methods and apparatus are set forth for uniquely identifying the aforementioned multi-card devices utilizing unique "combination type" POS IDs, where a combination type POS ID is a POS ID specifically preassigned to a combination of cards rather than to a single type of card for identifying the types of cards that make up the combination.

According to the invention, the unique combination type POS ID is partitioned across the combination of cards (for example, hardwired into each card). When the cards are combined, the partitioned ID is synthesized and becomes available to the system. The combination type ID may be used by the system to automatically identify and configure the multi-card device combination, perform diagnostics, etc., in the same manner that card type IDs are utilized to identify and configure individual feature cards in conventional systems supporting a POS type feature.

2. Description of the Related Art

Computer systems are well known in which hardware device identification and system setup are performed automatically. As indicated hereinabove, an example of such a computer system is the commercially available IBM PS/2 Model 70 which utilizes the aforementioned POS ID concept for hardware identification and system setup purposes. The POS ID concept is described in detail in copending U.S. patent application Ser. No. 07/296,387, filed on Jan. 6, 1989, now U.S. Pat. No. 5,038,320 Heath et al, hereby incorporated by reference.

Other systems utilizing IDs for device identification and system setup purposes include the systems described in U.S. Pat. Nos. 4,556,953 and 4,683,550 to Caprio et al and Jindrick et al, respectively. In Caprio et al, a data processing system is described that includes a set of interface circuit cards, each of which generate ID signals for configuration purposes. Each card has its own ID; however, no provision is made for altering a given card's ID or for otherwise generating a new ID to identify a particular combination of cards.

Jindrick et al, describes a modular plug-in instrumentation system that includes an instrumentation bus having a digital portion and a segmented analog portion. Each analog module attached to the bus includes an identification register that may have its inputs strapped to produce a desired ID code to identify the characteristics of a particular analog instrumentation module attached to the system. Again, no provision is made for altering a given modules ID or for otherwise generating a new ID to identify a particular combination of modules.

As indicated hereinabove, the IBM PS/2 Model 70, replaced physical device switches on the system board and feature cards with the software-writeable latches. In a system like the Model 70, feature cards are identified by a unique card type ID number that the system reads and interprets. The system then writes the option selects to the option latches. System information is kept in non-volatile RAM and is available to the system setup program at each power up time.

The POS feature in the PS/2 Model 70 not only facilitates the elimination of physical device switches from the system board and feature cards, but also permits installation of multiple identical feature cards, positively identifies any card by the slot in which it is installed, and resolves resource assignment conflicts.

As indicated hereinbefore, each card type is provided with a unique ID hardwired onto the card. The software-writeable latches, taking the form of a register in a preferred embodiment of the invention described in the incorporated reference, store parameter (configuration) data. This data may include, for example, an address factor (to programmably change the I/O address space of the card when required), priority data, status information and other system information providing for the efficient transfer of data between the system processor and the card (or between cards), all in addition to the POS ID which (as taught in the incorporated reference) serves as an address independent hardware identifier.

According to a preferred embodiment of the invention set forth in the incorporated reference, and support documentation accompanying IBM personal computing products having a Micro Channel architecture ("Micro Channel" is a registered trademark of the International Business Machines Corporation), each device (and associated feature card) which requires initialization to provide any specific function for such a system is uniquely identified by a two byte, hexadecimal POS ID number. Support code for automatic configuration and setup purposes in Micro Channel products is designed around the two byte ID convention.

The incorporated reference and the aforementioned support documentation teach that the POS ID number is utilized by configuration and setup programs to locate a given device's Adapter Description File (ADF). The ADF actually contains the specific configuration parameters associated with a given device. The POS ID is also taught as being suitable for use by diagnostic code to identify the type of a device under test.

With the introduction and use of processor complex cards, I/O risers to the system board (planar) complex, and with the introduction and use of secondary (daughter) cards and multiple adapter cards to provide more complex functions within computer systems, it would be desirable if the POS ID mechanism described in the incorporated patent application could be expanded to accommodate and identify multiple device combinations.

Preferably, unique two byte "combination type" IDs, for each type of multiple device combination, could be created so that the IDs remain compatible with existing system configuration and setup mechanisms (code) that utilize POS IDs to automate system configuration and setup. More generally, it would be desirable to generate n-byte wide combination type IDs where n is compatible with the underlying POS ID mechanism employed in a given system.

It would also be desirable to be able to provide the desired unique combination type IDs for multiple device combination possibilities in a given system without requiring the implementation of logic delays to determine what combinations exist.

Furthermore, it would be desirable to minimize the burden on deterministic code to locate, read and identify card combinations that are based on a one card per POS ID philosophy. Such a philosophy, particularly in view of the aforementioned introduction of processor complex cards, I/O risers to system board complexes, etc., would lead to a proliferation of POS IDs that quickly becomes difficult to manage and use.

Nevertheless, it would be desirable (for the aforementioned purpose of compatibility with existing systems) to apply the POS ID mechanism used for single cards to multi-card combinations. In particular, it would be desirable if the POS ID used for single cards (like a primary adapter card), could be somehow partitioned across multi-card combinations while keeping the ID at a predetermined width (for example, two bytes wide). Such an approach to device identification would allow a first ID value to be assigned to a given card (such as a primary adapter card); while a second, clearly distinguishable combination type, ID value could be assigned to a predefined combination of cards that includes the given card (such as a primary adapter card combined with a daughter card). The second ID value could, for example, become available to the system by somehow modifying the first ID in a predetermined fashion whenever the given card is combined with another card (or set of cards) to form the predefined combination.

Further yet, it would be desirable to provide apparatus for automatically "synthesizing", and making available to the system, the combination type POS ID value preassigned to a set of combined cards, when the value is first partitioned (effectively distributed) across the set of cards, after the cards have physically been combined. "Synthesizing" is defined herein as the taking of the portions of a predefined combination type POS ID that has partitioned across a set of cards and reformulating the ID from its constituent partitioned portions.

SUMMARY OF THE INVENTION

It is an object of the invention to provide apparatus for automatically identifying various multi-card device combinations without having to implement logic delays to perform the desired identification.

It is a further object of the invention to provide apparatus for automatically identifying various multi-card device combinations without having to manually set physical device switches to perform the desired identification.

It is still a further object of the invention to provide apparatus for automatically identifying various multi-card device combinations without having to alter system configuration and setup mechanisms (typically code) in data processing systems that are presently capable of performing automatic system configuration and setup utilizing unique device type (versus combination type) IDs (such as the POS IDs employed by the IBM PS/2 Model 70).

Further yet, it is an object of the invention to be able to effectively identify multi-card combinations utilizing unique IDs without having to resort to deterministic code.

Still further, it is an object of the invention to be able to automatically synthesize and make available to the system any partitioned combination type POS ID that has been distributed across a set of cards, whenever the set of cards are physically combined.

According to one embodiment of the invention, the desired "combination type" POS ID values are predetermined for each combination type that can be supported by a given system. Combination type IDs are thus assigned only for legitimate combinations of two or more cards. Then, given a desired width for the POS ID itself (for example, two bytes), any adapter card that can function without being combined with other adapter cards, hereinafter defined as a "primary" adapter card, is assigned a primary (ordinary card type) POS ID value. An example of a primary adapter card is a card that can be directly attached to the system card and be fully operational.

A predefined portion of the primary POS ID (e.g., a preselected m-bit field in the exemplary two byte ID), is designated as being modifiable as a function of the value of a predetermined m-bit partitioned POS ID value associated with any card (or combination of cards) that may legitimately be attached to the primary card. The m-bit value(s) of the card(s) attached to the primary are such that whenever a legitimate combination of cards is formed, the POS ID value output by the primary card reflects the appropriate predefined combination type POS ID that was partitioned across the card combination.

Thus, one aspect of the invention is a computer system, including at least one multi-card device comprised of a plurality of cards, in which automatic system configuration and setup may be performed utilizing POS IDs, comprising: (a) means for partitioning a unique predefined combination type POS ID value across said plurality of cards; (b) means for synthesizing said partitioned POS ID value whenever said plurality of cards are combined; and (c) means for selectively outputting the synthesized POS ID value associated with the combination of said plurality of cards, to thereby identify the multi-card device combination to the system.

An alternate embodiment of the invention contemplates assigning a primary ID value to the system card itself (as well as any primary adapter cards attached to the system card), and a combination type POS ID value to any legitimate combination of processor complexes and/or I/O risers that may be attached to the system card. By partitioning the combination type POS ID value assigned to such a combination, across the combination, the combination can be identified when its components are joined, allowing configuration information for the device combination to be located by the system.

Features of the invention include (1) being able to both directly or indirectly modify a primary POS ID value based on the partitioned POS ID value supplied by a card attached to a primary card; (2) being able to uniquely identify predefined combinations of cards without requiring deterministic code, logic delays, etc.; (3) being able to utilize existing POS ID mechanisms (applied in the context of a one card to one POS ID arrangement), to properly identify multi-card device combinations; and (4) being able to uniquely identify processor complexes and/or I/O risers combined with a system card.

These and other objects and features of the present invention and the manner of obtaining them will become apparent to those skilled in the art, and the invention itself will be best understood by reference to the following detailed description read in conjunction with the accompanying Drawing.

BRIEF DESCRIPTION OF THE DRAWING

FIG. 1 depicts an exemplary two byte POS ID arrangement used in commercially available systems such as the IBM PS/2 Model 70 personal computer.

FIG. 2 depicts in tabular form an example of POS ID partitioning in accordance with a preferred embodiment of the invention.

FIG. 3 depicts an example of a primary adapter card and set of four daughter cards having a partitioned combination type POS ID corresponding to the IDs depicted in the table shown in FIG. 2.

FIGS. 4a and 4b depicts in tabular form another example of POS ID partitioning to indicate various combinations of how a system board may be combined with (or without) I/O riser cards, processor complex cards and a secondary card.

DETAILED DESCRIPTION

Figure 5:
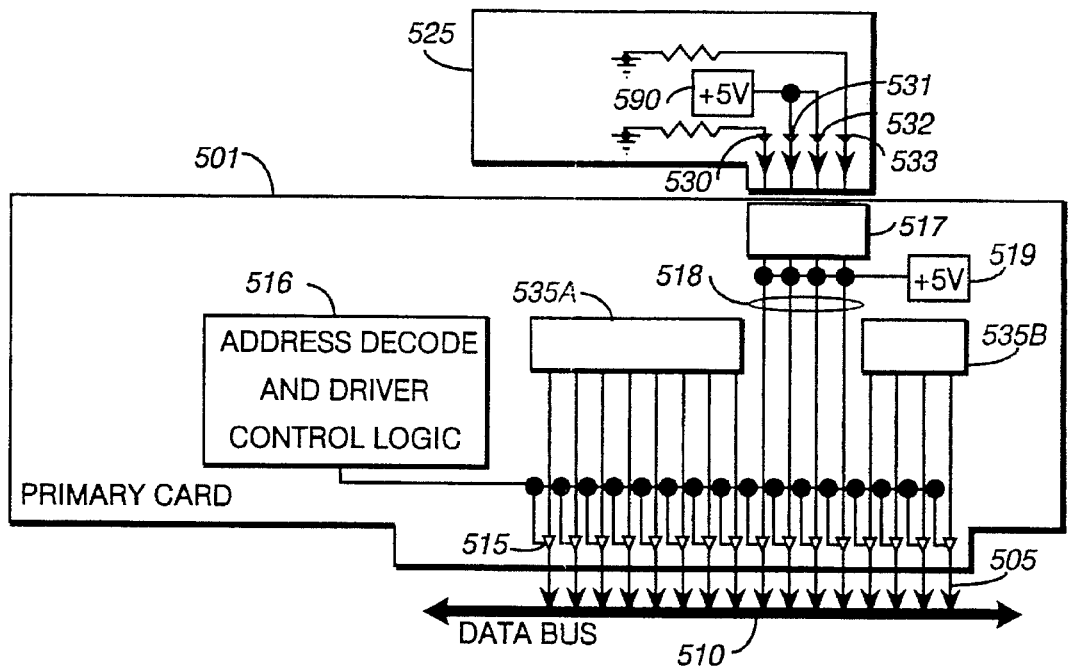
FIG. 5 depicts apparatus which may be utilized, according to one embodiment of the invention, to partition a combination type POS ID and directly modify the partitioned POS ID value assigned to a first card (such as a primary adapter card) when combined with a second card (such as a daughter card) to effectively synthesize (and make available to the system) the combination type POS ID that was partitioned.

The invention will be described, for the sake of illustration only, in the context of an IBM PS/2 Model 70 personal computer wherein a two byte card type POS ID mechanism is employed for performing automatic system configuration, setup and diagnostics. Those skilled in the art will readily be able to adapt the teachings set forth hereinafter to computer systems in which the allocation of bits or bytes for a POS type ID has a different width or field structure.

FIG. 1 depicts an exemplary two byte POS ID, 101, having a value of ABCD (hex) on adapter card 100. The POS ID is shown stored, for the purpose of illustration only, with its least significant byte being byte 0.

To maintain compatibility with existing hardware and software in the exemplary two byte POS ID system, multi-card adapters (adapters with attached daughter cards) and multi-card planar complexes system (boards with pluggable processor complexes and/or I/O risers), must also provide the system with a unique two byte POS ID for each legitimate combination of cards.

To provide the required flexibility for multi-card adapters and planar complexes to have a unique POS ID for every possible combination, yet not require configuration and set-up code to change, or implement logic delays to determine what combination exists, etc., the POS ID for a combination of cards should, according to the invention, be partitioned across the multiple cards.

Methods and apparatus for performing the desired combination type POS ID partitioning will be described in detail hereinafter. However, for a full appreciation of how combination type (and single device type) POS IDs may be used for automatic system configuration, setup, etc., reference is made to the previously incorporated patent application assigned to the same assignee as the instant invention.

As indicated hereinbefore, the original POS ID concept relies on the one POS ID per card type. This philosophy is also utilized in Micro Channel architecture PS/2 systems to identify the system planar boards.

Furthermore, as indicated hereinbefore, with the advent of new design strategies and the increase in function of both adapters and system planar boards, the use of multi-card adapters and planar complexes has become more prevalent. Based on these developments in the state of the art, the continued use of the one POS ID per card type philosophy will force a continually increasing burden onto the deterministic code to locate, read, and identify combinations based on the proliferous POS IDs which will exist.

POS ID partitioning solves these problems, allowing one combination type POS ID to be used for a given combination of cards, as illustrated by the following example set forth with reference to FIG. 2 in which POS ID partitioning is illustrated for adapters having multiple attached daughter cards.

The table shown in FIG. 2 illustrates a primary adapter card "A" that is assumed to provide a basic communications function. Daughter cards "1" through "4" provide additional functions when attached to Adapter "A". The table shows what ID is resident on each card, as well as the POS ID which would appear when a given Adapter/daughter card combination is interrogated by the system. For the sake of illustration only, an "F" (hex) is utilized to indicate that no daughter card is present.

FIG. 2 illustrates that according to the invention, the POS ID presented to the system is determined by the daughter card (or lack of daughter card) attached to the primary adapter card; not by self-evaluation by the adapter as to what function is provided by the combination.

It should also be noted that in accordance with the illustrative embodiment of the invention presented in FIG. 2, the primary adapter card is assigned a two byte value of "ABC-" where the "-" is the field portion of the primary adapter card POS ID that is modified based on the particular daughter card (if any) that is attached to the primary. Hence, according to this illustrative embodiment of the invention, a 4 bit field (i.e., the aforementioned m-bit field with m=4), in the two byte POS ID for the primary adapter card (i.e., the aforementioned n-byte POS ID with n=2), is subject to being modified to form a combination type POS ID that properly identifies the card combination as a function of a partitioned combination type ID.

A pictorial representation of what is illustrated in FIG. 2 is shown in FIG. 3. Primary adapter card "A", shown as card 301, may be identified by the "ABC-" portion of the POS ID stored on the card. The POS ID for this card type (i.e., with no daughter card attached) would be "ABCF". Again, it should be noted that the ID associated with card 301 is shown stored with its least significant byte being byte 0. As explained in the incorporated reference, card 301 typically develops the ID utilizing a set of prewired driver circuits.

The set of daughter cards (daughter cards "1"–"4" from the table shown in FIG. 2), that may each be attached to primary adapter card 301, are labeled 302-305 in FIG. 3. Daughter card "1" (unit 302) is shown to "store" (or otherwise generate) the hex value "E". This corresponds to the partitioned portion of the combination type POS ID "ABCE" (as shown in FIG. 2) that will identify card 302 combined with card 301.

Similarly, card 303 (daughter card "2") is shown to "store" the hex value "D"; card 304 stores the hex value "C"; and card 305 is shown to store the hex value "B".

When any of the daughter cards depicted in FIG. 3 is combined with the primary, the resulting combination type POS ID value uniquely describes the combination as was previously illustrated with reference to FIG. 2.

The POS ID partitioning concept can also be applied to the design strategy of planar complexes that ultimately are to be automatically identified by the system in which they are incorporated. A planar complex is simply the combination of system board, processor complex card and/or I/O riser card.

Multi-partitioned POS IDs (i.e., combination type POS IDs that are formed from various combinations of elements, but which each contain a common element—like a system board) can, as will be demonstrated hereinafter, be used to uniquely identify a system board with (1) one of several possible I/O riser cards plugged on; (2) one of several possible processor complex cards plugged in with one of several possible secondary cards attached, etc. The following example, set forth with reference to FIG. 4, illustrates the concept of a multi-partitioned POS ID used for this purpose.

For the sake of illustration only, assume that a new system board is designed to be used in two new systems. System "A" is a desk-top system; system "B" is a floor standing system. The difference between the two systems is the packaging and the I/O supported (i.e., the systems include different I/O risers).

Assume further that both system "A" and system "B" will have two models: model "C" which has a processor complex that operates at 25 MHz and model "D" which has a processor complex that operates at 30 MHz. Model "D" is also designed to operate with an optional coprocessor attached on a secondary "daughter" card "E".

The POS ID partitioning to support the various systems, models and options described hereinabove illustrated in the tables shown in FIGS. 4A and 4B.

The system board is, for this example, preassigned a partitioned POS ID value (all values are in hex) of "9 - - - "; the I/O riser card for System "A" is preassigned the partitioned POS ID value "-A--"; the I/O riser card for System "B" is preassigned the partitioned POS ID value "-B--; the processor complex "C" is preassigned the partitioned POS ID value "--C-"; the processor complex "D" is preassigned the partitioned POS ID value "--D-"; and the secondary card "E" is preassigned the partitioned POS ID value "---E". This assignment of partitioned POS ID values to the various components that may be combined is shown in FIG. 4A.

FIG. 4B illustrates various combinations of the cards and shows how the multi-partitioned POS ID values can be combined to uniquely identify each of the system type combinations listed in FIG. 4B. It should be noted once again that in the illustrative embodiment of the invention, the "F" portion of a combination type POS ID signifies the absence of any card that could have been attached to the primary or system card.

The concept of POS ID partitioning as set forth herein does not rely (and is not intended to rely) on the explicit representation of a portion of the total POS ID by any card. The value presented, for example, by the daughter card may represent a location in a POS ID look-up table on the primary adapter card or planar card. This implicit representation of the POS ID would then allow non-consecutive POS IDs to be assigned to the possible adapter/daughter card or planar complex combinations.

Figure 6:
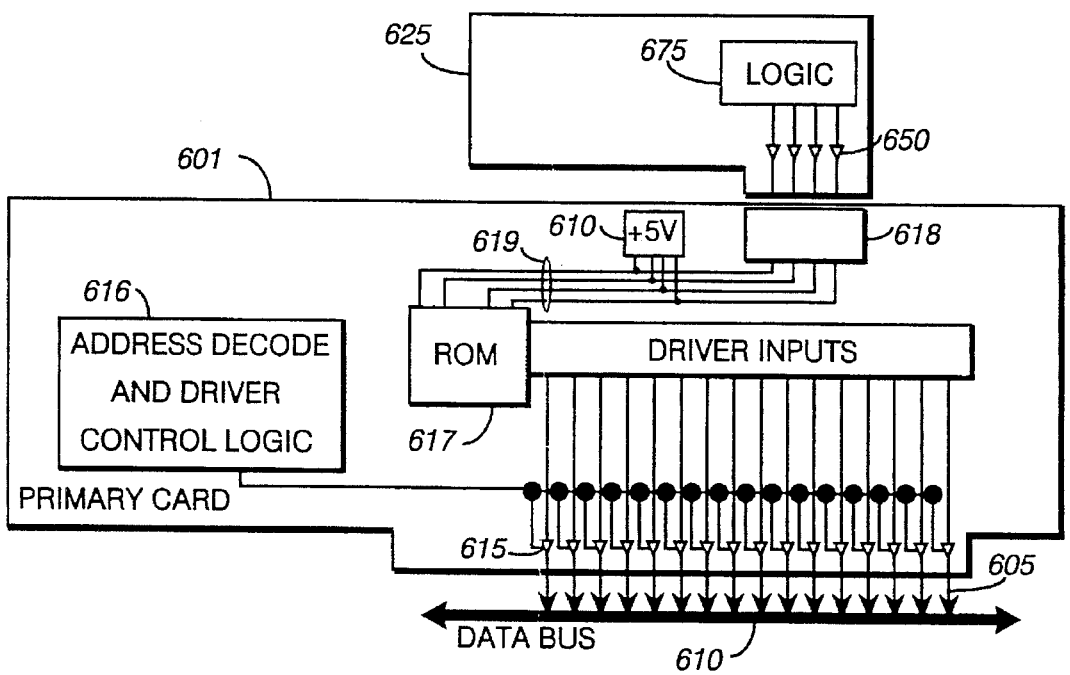
FIG. 6 depicts apparatus which may be used to indirectly determine the combination type POS ID to be associated with a particular card combination.

To illustrate this point further and show exemplary means for forming combination type IDs both directly and indirectly (e.g., via table look-up) when cards are combined, reference should be made to FIGS. 5 & 6.

FIG. 5 depicts apparatus which may be utilized, according to one embodiment of the invention, to partition a combination type POS ID and directly modify the partitioned POS ID value assigned to a first card (such as a primary adapter card) when combined with a second card (such as a daughter card) to effectively synthesize the combination type POS ID that was partitioned.

FIG. 6 depicts apparatus which may be used to indirectly determine the combination type POS ID to be associated with a particular card combination.

In FIG. 5, a primary card, 501, is shown coupled to data bus 510 via links (sixteen of them) 505. The primary card, for the sake of illustration only, may be assumed to have a POS ID of "9A–C". The corresponding representation in bit form (with four bits per hexadecimal place holder) is 10011010 - - - 1100.

Primary card 501 is also shown to include sixteen tri-state drivers (each like driver 515); address decode and driver control logic (516), the function of which are fully described in the incorporated reference; POS ID number (10011010 - - - 1100) hardwired to the driver 515 inputs (535A and 535B); a daughter card connector (517); and a set of pins (518) tied to +5 volts (519). The hardwired POS ID number (value) may be generated, for example, by tying the connections to the drivers to +5 volts (for a "1") and ground (for a "0") within the blocks labeled 535A and 535B.

A daughter card that may be attached to primary card 501, via connector 517, is shown also shown in FIG. 5 as card 525.

With no daughter card present, when the address decode and driver control logic (516) recognizes a "POS ID READ" from the system, it activates the drivers (515) and "9AFC" is driven onto data bus 510. The "F" comes from pins 518 which are shown tied to +5 volts (519) and indicates the absence of a daughter card. If daughter card 525 is plugged into card primary card 501, the bit pattern "1111" (corresponding to the "F") is effectively overridden and changed to "0110". Card 525 can be seen to directly generate the field "0110" by drivers 530 and 533 being tied to ground; while drivers 531 and 532 are tied to +5 volts (source 590). The next time a POS ID READ" occurs, "9A6C" is driven onto data bus 510. Such POS ID is a composite ID which identifies the type of the multi-card device by the types of cards primary and daughter cards comprised in such device.

The combination type POS ID "9A6C" is effectively partitioned across cards 501 and 525 and directly synthesized when the cards are combined.

In FIG. 6, an alternate arrangement for partitioning and then synthesizing a combination type POS ID is presented. Primary card 601 is shown coupled to bus 610 via a set of tri-state driver (sixteen of them, each like driver 615), and a set of links, each like link 605.

Primary card 601 is shown to include address decode and driver control logic 616 (similar to logic 516 of FIG. 5); read only memory (ROM) 617 which stores at least one (and possibly many) of the m-bit fields (or bit combinations) that can be used to modify the POS ID of the primary card as a function of any card (or cards) attached to the primary card; daughter card connector 618; a set of ROM index pins (619) each coupled to a +5 volt source (like source 620).

A daughter card that may be attached to primary card 601, via connector 618, is shown also shown in FIG. 6 as card 625.

With no daughter card plugged into connector 618, the index pins (619) have a value of "F" (1111). Assuming, for the sake of illustration, that the POS ID "9ABC" is in ROM indexed at "F". When the address decode and driver control logic (616) recognizes a "POS ID READ" from the system, it activates drivers 615 and "9ABC" is driven onto data bus 610 over links typified by link 605.

If daughter card 625 is plugged into connector 618, index pins 619 take on the value partitioned onto daughter card 625. For the present example, the daughter card ID (really an index into the ROM on card 601) is assumed to be generated by the drivers (650) shown on card 625, under the control of logic in block 675. An example of how these drivers can be tied to ground or +5 volts to generate any desired ID value has already been set forth herein with reference to the description of FIG. 5.

Assuming, again for the sake of illustration only, that the POS ID "CDEF" is in ROM 617 indexed at the value of the daughter card ID provided via drivers 650. Then, the next time a "POS ID READ" occurs, "CDEF" will be driven onto data bus 610 via card 601.

The combination type POS ID "CDEF" is effectively partitioned across cards 601 and 625 and indirectly synthesized when the cards are combined.

Those skilled in the art will readily appreciate that POS ID partitioning can be utilized to identify various combinations of cards, including stacked (2, 3 or more levels) of combined cards, one or more cards attached to a single primary card, etc.

What has been described are methods and apparatus meeting all of the objectives set forth hereinbefore. Those skilled in the art will recognize that the foregoing description has been presented for the purposes of illustration and description only. It is not intended to be exhaustive or to limit the invention to the precise form disclosed, and obviously many modifications and variations are possible in light of the above teaching.

For example, those skilled in the art will readily appreciate that the concept of POS ID partitioning does not restrict the partition boundaries to a specific number of bits. The examples shown are simplified by using four-bit divisions, however, any division is possible, as long as unique identification of the different possible combinations is maintained.

The embodiments and examples set forth herein were presented in order to best explain the principles of the instant invention and its practical application to thereby enable others skilled in the art to best utilize the instant invention in various embodiments as are suited to the particular use contemplated.

What is claimed is:

1. In a computer system having a system bus coupled to a plurality of cards each having a POS ID that uniquely identifies the type of a card wherein cards of the same type have the same POS ID and cards of different types have different POS IDs, and setup means operative to interrogate said cards and read a POS ID from each card, each POS ID comprising a predetermined number of bits, the improvement comprising:

a multi-card device attached to said bus, said device comprising a primary card attached to said bus and having at least one secondary card plugged into said primary card;

said primary card comprising a plurality of data lines corresponding to said bits of a POS ID, said data lines being coupled to said bus, and primary card ID means defining a primary card ID that identifies the type of primary card, said primary card ID means having a plurality of outputs coupled to predetermined ones of said data lines;

secondary card ID means for generating a secondary card ID that identifies the type of secondary card, said secondary card ID means having a plurality of outputs coupled to other ones of said data lines; and said primary card further comprising a plurality of drivers respectively connected to said data lines and operating means for operating said drivers in response to a POS Read signal from said setup means to simultaneously drive said primary card ID and said secondary card ID onto said data lines and transmit a composite POS ID on said bus which identifies the type of said multi-card device by the types of cards comprised in such device.

2. A computer system in accordance with claim 1 wherein:

said primary card further comprises null signal means connected to said other ones of said data lines for generating an indication signifying absence of a secondary card, which indication is overridden by said secondary card ID.

3. A computer system in accordance with claim 2 wherein:

said primary card ID and said secondary card ID are hardwired and fixed on said primary card and on said secondary card.

4. A computer system in accordance with claim 1 wherein:

said drivers have data inputs connected to said primary and secondary card ID means and control inputs connected to said operating means; and said operating means has an output connected to all of said control inputs for simultaneously operating said drivers in response to a signal on such output.

5. A computer system in accordance with claim 1 wherein:

said primary card ID means and said secondary card ID means comprise a storage device on said primary card for storing a plurality of predefined POS IDs each of which includes said primary card ID; and and said secondary card ID means further comprises an index value stored on said secondary card for indexing into said storage device and reading a POS ID that includes both said primary card ID and said secondary card ID.

6. In a computer system having a system bus coupled to a plurality of cards each having a POS ID that uniquely identifies the type of a card wherein cards of the same type have the same POS ID and cards of different types have different POS IDs, and setup means operative to interrogate said cards and read a POS ID from each card, each POS ID comprising a predetermined number of bits, the improvement comprising:

a multi-card device attached to said bus, said device comprising a primary card attached to said bus and having at least one secondary card plugged into said primary card;

said primary card comprising a plurality of data lines corresponding to said bits of a POS ID, said data lines being coupled to said bus, a plurality of drivers each having an output connected to a different one of said data lines, a control input, and a data input, operating means having a single output connected to all of said control inputs, said operating means being operative in response to receiving a POS ID Read signal to transmit a control signal to all of said drivers and simultaneously drive onto said data lines ID signals present at said data inputs, primary card ID means defining a primary card ID that identifies the type of primary card, said primary card ID means having a plurality of outputs coupled to predetermined ones of said data inputs, and a plurality of driver data inputs connected to other ones of said data inputs for inputting a secondary card ID; and secondary card ID means for generating a secondary card ID that identifies the type of secondary card, said secondary card ID means having a plurality of outputs coupled to said driver data inputs, whereby said drivers are operative in response to receiving said control signal to simultaneously drive said primary card ID and said secondary card ID onto said data lines and transmit a composite POS ID on said bus which identifies the type of said multi-card device by the types of cards comprised in such device.

* * * * *